United States Patent Office 3,042,728
Patented July 3, 1962

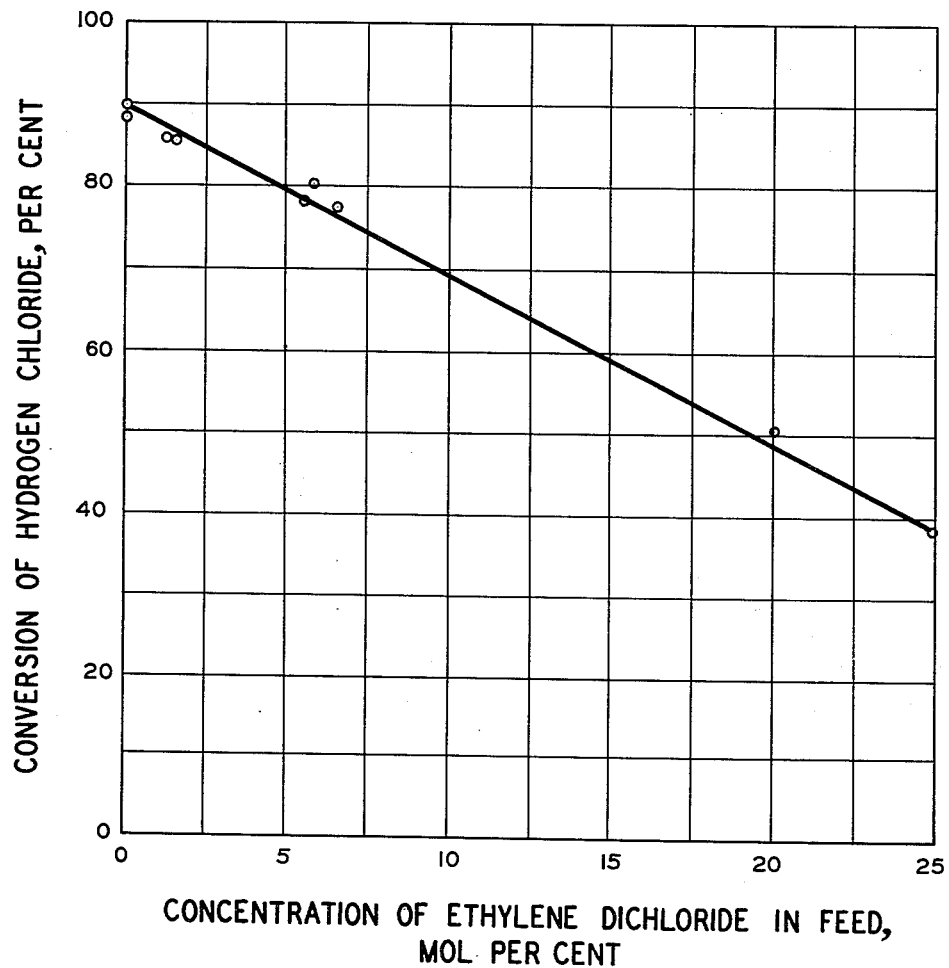
INVENTORS
DONALD H. HIRSH
CHARLES E. HODGES

3,042,728
PROCESS FOR THE PRODUCTION OF
ETHYLENE DICHLORIDE
Donald H. Hirsh and Charles E. Hodges, South Charleston, W. Va., assignors to Union Carbide Corporation, a corporation of New York
Filed Apr. 15, 1960, Ser. No. 22,545
3 Claims. 

This invention relates to a new and improved process for the production of ethylene dichloride by the reaction of hydrogen chloride, ethylene and oxygen.

A process for the production of chlorine by the oxidation of hydrogen chloride with air over a copper containing catalyst was developed by Deacon in 1868. The Deacon reaction may be represented as follows:

$$2HCl + \tfrac{1}{2}O_2 \rightleftharpoons Cl_2 + H_2O$$

Since this is a reversible reaction, it was very difficult to obtain a high rate of conversion of the initial reactants to chlorine. The process requires temperatures of from 400–500° C.

German Patent 430,539, issued in 1922, describes a modified version of the Deacon process in which ethylene was added to the reactants to act as an acceptor for the chlorine produced by the oxidation of the hydrogen chloride. Since the ethylene reacts with the chlorine as fast as it is produced in this modified Deacon process, the oxidation of the hydrogen chloride is promoted by shifting the equilibrium of the oxidation reaction toward completion. Moreover, the oxidation of the hydrogen chloride can be conducted at much lower temperatures, i.e., at 200 to 300° C., than those temperatures required for the unmodified Deacon process. Further, operation at these lower temperatures has the advantage of enhancing the stability of the copper catalyst and thereby lengthening the active life of the catalyst.

The modified Deacon process is illustrated by the following equation:

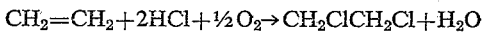

Ethylene dichloride produced by this process is a valuable compound. It is especially useful in the production of vinyl chloride.

In single pass operation, i.e., when the unreacted portion of the starting material is not recycled to the reactor, practically all of either the hydrogen chloride or the ethylene can be reacted by operating with an excess of the other.

In commercial operation, a logical operating technique would be to utilize an excess of ethylene in the reaction feed to assure essentially complete conversion of the hydrogen chloride in a single pass through the reactor. Most of the ethylene dichloride produced would be removed from the crude reaction product either by condensation or by quenching the hot reactor effluent with water. Following this, unreacted ethylene containing oxygen and nitrogen, introduced as air for the oxidation, together with gaseous by-products, such as the carbon oxides, would be recycled to the process. This recycle stream would ordinarily carry with it a portion of the ethylene dichloride, since the need for special precautions to remove this material would not be expected to be necessary.

It has been found, however, that the presence of any ethylene dichloride in the recycled stream has an adverse effect on the rate of conversion of hydrogen chloride and ethylene. The loss in conversion of the reactants is much greater than can be attributed merely to a shift in the chemical equilibrium of the reaction. The presence of ethylene dichloride in the reaction stream in some way inhibits the reaction, probably by deleteriously affecting the catalyst.

The effect of ethylene dichloride on the rate of conversion of hydrogen chloride is illustrated in the accompanying graph. As can be seen from the graph, the more ethylene dichloride present in the feed, the less is the conversion of hydrogen chloride.

Accordingly, it is an object of this invention to prevent this inhibiting of the reaction by the gaseous recycle stream in a modified Deacon process.

It has now been found that in the reaction of ethylene, hydrogen chloride and oxygen, a very high conversion of hydrogen chloride and ethylene to ethylene dichloride can be attained in a cyclic operation by scrubbing the effluent gases from the reactor with dimethyl phthalate before recycling. This procedure removes substantially all of the ethylene dichloride from the recycle stream thereby eliminating any poisoning effect.

In the practice of this invention, ethylene, hydrogen chloride and oxygen are fed to a reactor containing a catalyst for the reaction. Either the ethylene or hydrogen chloride are preferably used in molar excess of the other. The concentrations of the reactants in the feed stream are not particularly critical and may be varied within wide limits. Preferred proportions of reactants are from about 4 to 10 mol percent ethylene, about 4 to 9 mol percent hydrogen chloride and about 2 to 4 mol percent oxygen with the remainder of the feed stream being predominantly nitrogen. The temperature at which the reaction is run may vary from about 200° to 350° centigrade. A suitable catalyst is a copper-alumina catalyst. The total contact of the feed over the catalyst may vary from about 1 to 30 seconds.

It is to be understood that the particular way the modified Deacon process is conducted is outside the scope of this invention. As has been previously pointed out, this process is well known in the art. The instant invention resides in the discovery that ethylene dichloride inhibits the reaction and this problem can be solved by scrubbing with dimethyl phthalate.

The gases leaving the reactor may be passed directly to the dimethyl phthalate scrubber. However, it is preferred to first remove as much ethylene dichloride as possible, such as by quenching with caustic solution or with water before the recycle stream is passed to the scrubber. This facilitates easier recovery of the product, ethylene dichloride, and increases the effectiveness of the dimethyl phthalate scrubber.

Any scrubbing apparatus may be used for this operation. A particularly suitable apparatus comprises a scrubbing chamber filled with porcelain rings. The recycle gases are fed into the bottom of the chamber and dimethyl phthalate is fed in at the top. The preferred rate of feed of dimethyl phthalate to the scrubber is about 50 to 100 pounds per hour per 100 to 1000 standard cubic feet of cycle gas. Standard cubic feet is defined as being measured at 20° C. and at one atmosphere. Dimethyl phthalate containing the absorbed ethylene chloride is drawn off from the bottom of the scrubber. The liquor may be processed to remove ethylene dichloride and recycled to the scrubber. The scrubbed gases are withdrawn from the top of the scrubber and recycled to the reactor.

The following example illustrates the deleterious effect which ethylene dichloride has on the recycle gases:

Example 1

A mixture of ethylene, hydrogen chloride and oxygen in a molar ratio of 1 to 1.14 to 0.45 was initially fed to a one inch by 26.5 foot mild steel reactor. The pressure in the reactor was 150 p.s.i.g. Twenty-five feet of the reactor was covered by a jacket through which was circulated heated Dowtherm A. The jacketed length of the reactor was filled with a pelleted copper-alumina catalyst. The gases leaving the reactor were cooled and approximately two thirds of the ethylene dichloride was removed by quenching with five percent caustic. The unreacted gases were recycled to the reactor.

Fresh hydrogen chloride, ethylene and air were continuously blended with the recycled gases so that the feed to the reactor was composed of 5.8 mol percent ethylene, 6.6 mol percent hydrogen chloride and 2.6 mol percent oxygen, the remainder being predominantly nitrogen with small amounts of carbon oxides and other reaction products, including approximately 2 mol percent ethylene dichloride. The contact time in the reactor was 7.7 seconds and the temperature of the reactor jacket was 250° C. Under these conditions, the conversion of the hydrogen chloride feed was 78.0 percent in a single pass through the reactor.

The following example illustrates the effect of scrubbing the recycle gases with dimethyl phthalate:

*Example 2*

An experiment was conducted at essentially the same conditions as Example 1 but with the exception that after removal of approximately two-thirds of the contained ethylene dichloride from the reactor effluent, the recycle stream was directed through a scrubber to which dimethyl phthalate was fed at a rate of 92 pounds per hour. Approximately 57 percent of the residual ethylene dichloride was absorbed by the dimethyl phthalate. The conversion of hydrogen chloride in this experiment was 92.7 percent.

What is claimed is:

1. In the production of ethylene dichloride in a cyclic operation by the reaction of ethylene, hydrogen chloride and oxygen, the improvement which comprises scrubbing the effluent gas from the reactor with dimethyl phthalate prior to recycling the stream to the reactor.

2. A process according to claim 1 wherein a major portion of ethylene dichloride is removed from the effluent gas prior to scrubbing with dimethyl phthalate.

3. A process for removing ethylene dichloride from a mixture consisting of ethylene dichloride, oxygen, ethylene and hydrogen chloride which comprises scrubbing the mixture with dimethyl phthalate.

References Cited in the file of this patent

UNITED STATES PATENTS

| | | |
|---|---|---|
| 2,575,167 | Fontana et al. | Nov. 13, 1951 |
| 2,838,578 | Conrad et al. | June 10, 1958 |